United States Patent
Wolter et al.

(10) Patent No.: US 6,349,680 B1
(45) Date of Patent: Feb. 26, 2002

(54) COOLING DEVICE FOR AN INTERNAL COMBUSTION ENGINE

(75) Inventors: Artur Wolter, Kornwestheim; Heiner Neumann, Wiernsheim; Manfred Hochkönig, Möglingen, all of (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/659,038

(22) Filed: Sep. 11, 2000

(30) Foreign Application Priority Data

Sep. 9, 1999 (DE) .......................... 199 43 004

(51) Int. Cl.$^7$ ................................. F07P 1/06
(52) U.S. Cl. ................... 123/41.31; 123/41.33
(58) Field of Search ................ 123/41.29, 41.31, 123/41.33

(56) References Cited

U.S. PATENT DOCUMENTS

| 4,520,767 A | * 6/1985 | Roettgen et al. ......... 123/41.33 |
| 5,638,774 A | * 6/1997 | Albertson et al. ....... 123/41.33 |
| 6,053,131 A | * 4/2000 | Mueller et al. .......... 123/41.33 |

FOREIGN PATENT DOCUMENTS

| DE | 25 27 872 | 1/1977 |
| DE | 41 21 379 A1 | 1/1992 |
| DE | 196 06 202 A1 | 8/1997 |
| EP | 785 379 A2 | 1/1997 |
| EP | 787 929 A2 | 1/1997 |
| JP | 4-109027 | 4/1992 |

* cited by examiner

Primary Examiner—Noah P. Kamen
(74) Attorney, Agent, or Firm—Crowell & Moring LLP

(57) ABSTRACT

A cooling device for an internal combustion engine of a motor vehicle, particularly of a passenger car, has at least one radiator, through which cooling water is flowing. The radiator is disposed in a cooling cycle and connected over a supplying pipeline and a returning pipeline with the internal combustion engine. Moreover, a heat exchanger, with which the oil of a transmission is cooled, is provided in the cooling cycle. For spatial and functional reasons, a flow resistance is connected in the supplying pipeline before the internal combustion engine. A branching pipeline, which is connected with the heat exchanger of the transmission and downstream, behind the heat exchanger, with the flow resistance, leads away from the supplying pipeline.

8 Claims, 1 Drawing Sheet

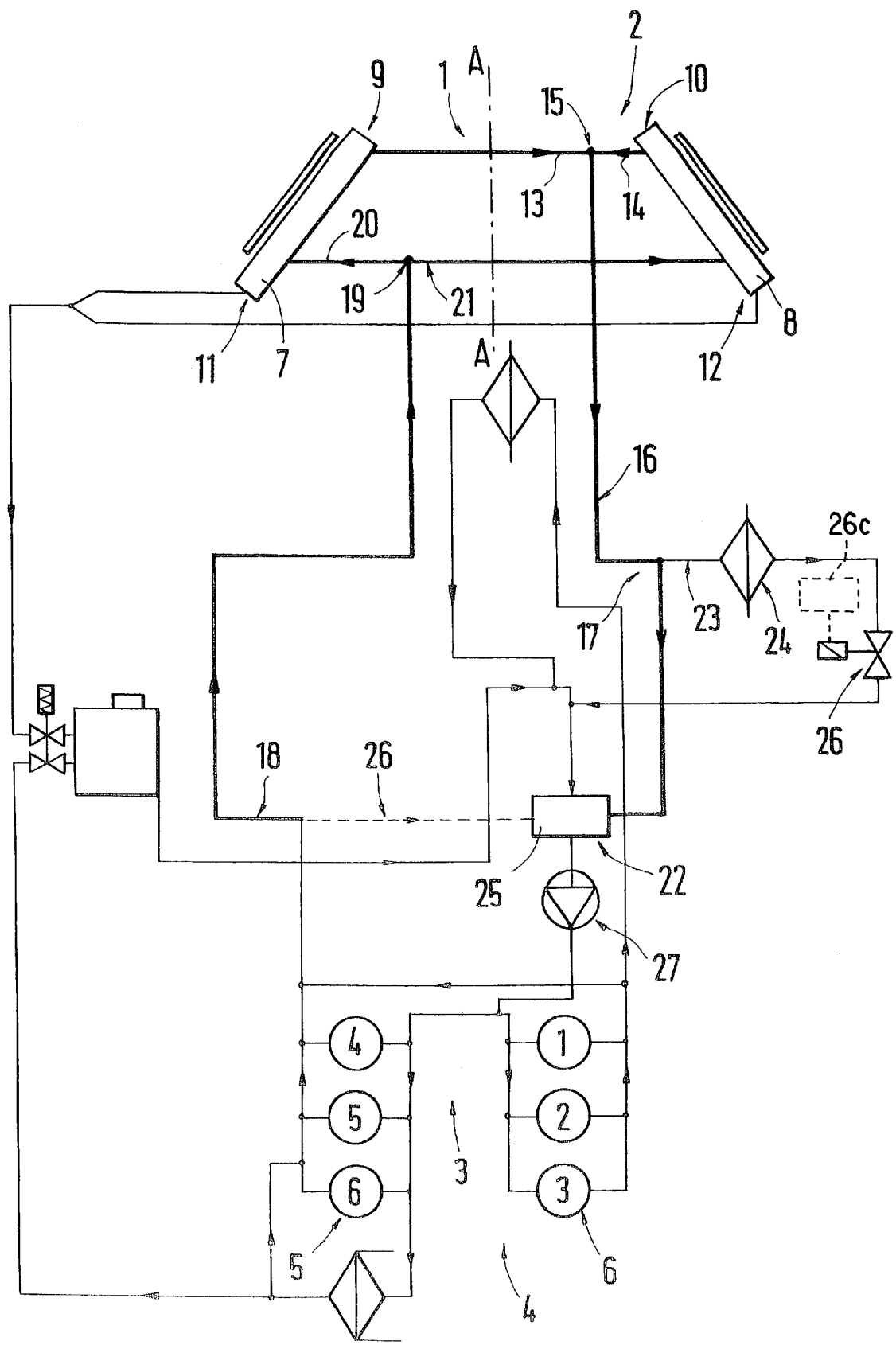

COOLING DEVICE FOR AN INTERNAL COMBUSTION ENGINE

BACKGROUND AND SUMMARY OF THE INVENTION

This application claims the priority of German Patent Document 199 43 004.7, filed Sep. 9, 2000, the disclosure of which is expressly incorporated by reference herein.

The invention relates to a cooling device for an internal combustion engine which in use is installed in a passenger motor vehicle. The cooling device includes at least one radiator disposed in a cooling circuit connected with an internal combustion engine by a supplying pipeline and a returning pipeline for flowing cooling water. The cooling circuit also has a heat exchanger for cooling oil of an automatic transmission.

Equipment for controlling the temperature of the transmission oil is known, for example, from European Patent Document EP 0 787 929 A2, which equipment interacts with a radiator of a liquid-cooled internal combustion engine. With this equipment, an attempt is made to keep the temperature of the transmission oil at a defined level.

The European Patent Document EP 0 785 379 A2 describes a transmission cooling system, which has a heat exchanger. This heat exchanger is integrated in an oil sump of a transmission housing which is interlocked with a liquid-cooled internal combustion engine.

It is an object of the invention to provide a cooling device for an internal combustion engine with a heat exchanger for cooling oil of a transmission, for which the heat exchanger is installed in a structurally simple manner in the cooling circuit and the transmission oil is cooled concertedly.

Pursuant to the invention, this objective is accomplished by providing a cooling device of the above-noted general type, wherein a cooling device for an internal combustion engine which in use is installed in a passenger motor vehicle comprises at least one radiator disposed in a cooling circuit and connected with an internal combustion engine by a supplying pipeline and a returning pipeline through which cooling water is flowing, which cooling circuit has a heat exchanger for cooling oil of an automatic transmission, wherein a flow resistance is connected in the supplying pipeline before the internal combustion engine, and wherein a branching pipeline leading away from the supplying pipeline is connected behind the heat exchanger with the flow resistance and is connected with the heat exchanger of the transmission.

Further advantageous features of preferred embodiments of the invention are described below and in the claims.

The main advantages achieved with the invention are seen therein that, on the one hand, the heat exchanger for cooling engine oil can be installed in a simple manner in the cooling circuit of the cooling device and, on the other hand, is acted upon concertedly. This is supported by the flow resistance. This flow resistance is a thermostat, which bypasses the cooling cycle in the warming-up phase of the internal combustion engine, a loss of pressure at the thermostat being utilized in order to produce an adequate pressure gradient for the functioning of the heat exchanger in the branch line. The shut-off valve in the branch line ensures that the temperature of the oil in the transmission, upon reaching the operating temperature of the internal combustion engine, can be varied independently of the cooling circuit between the radiator and the internal combustion engine in such a manner that the heat exchanger becomes effective only when the temperature of the transmission oil has reached a predetermined value which may be relevant for the fuel consumption of the internal combustion engine.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a diagrammatic view of a motor vehicle from above with a cooling system constructed according to a preferred embodiment of the present invention.

DETAILED DESCRIPTION OF THE DRAWINGS

In the front end 1 of a motor vehicle, the details of which are not shown, a cooling device 2 for an internal combustion engine 3 is provided. The internal combustion engine 3 has opposite rows of cylinders 5 and 6 and may be disposed in the rear end 4 of the motor vehicle, or adjacent to the rear end in a mid-engine construction. The cooling device 2 has two radiators 7, 8, which extend obliquely to a central longitudinal plane A—A of the motor vehicle. Moreover, the front sides 9, 10 of the radiator 7, 8 are closer to the central longitudinal plane A—A than are the rear sides 11, 12.

The radiators 7, 8 are connected with cooling water outlet pipelines 13, 14 to a collecting device 15 which is connected with a supplying pipeline 16 with cylinders of the two rows 5 and 6. This configuration results in a cooling cycle 17 shown in enlarged bold lines. A returning 18, which leads to a branching device 19, is connected downstream from the cylinders of the internal combustion engine. The cooling water returning pipelines 20, 21 are placed between the branching device 18 and the radiators 7, 8.

Upstream of the internal combustion engine, a flow resistance 22 is connected in the supplying pipelines 16. Between the cooling device 2 and the flow resistance 22, a pipeline 23, over which cooling medium of the cooling cycle 17 is supplied to the heat exchanger 24, branches off from the supplying pipeline 16. The flow resistance 22 is formed by a thermostat 25, with which a bypass 26 and a concertedly rapid operating temperature of said internal combustion engine is brought about during the warming-up phase of the internal combustion engine 3. The heat exchanger 24 cools the oil of a transmission of the motor vehicle, which is not shown, and the branching pipeline 23 is connected downstream behind the heat exchanger 24 to the flow resistance 22 or to the thermostat 25. Moreover, a shut-off valve 26 is connected in the branching pipeline 23 between the heat exchanger 24 and the thermostat 25. Via a control 26C of this electrically operated shut-off valve 26, the temperature of the transmission oil can be affected independently of the cooing cycle. The oil sump temperature and optionally also the outlet temperature of the internal combustion engine 3 are parameters for controlling the shut-off valve 26, which is closed during the warming-up phase of the internal combustion engine.

Finally, the cooling water of the cooling device is cycled with a water pump 27, which is disposed between the internal combustion engine 3 and the flow resistance 22 or the thermostat 25.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling device for an internal combustion engine and a transmission of a passenger motor vehicle, comprising:
   an engine cooling circuit including at least one radiator and a coolant circuit with a coolant supply line leading to an engine and a coolant return line leading from the engine, and
   a transmission heat exchanger for cooling oil of an automatic transmission,
      wherein a branching pipeline is connected to the coolant supply line and flows through the transmission heat exchanger,
      wherein a flow resistance is connected in the coolant supply line upstream of the internal combustion engine and downstream of the connection with the branching pipeline, and
      wherein a shut-off valve, which is controlled as a function of the temperature, is connected in the branching pipeline downstream behind the transmission heat exchanger.

2. A cooling system according to claim 1, wherein the shut-off valve is switched at least as a function of oil sump temperature of the transmission.

3. A cooling system according to claim 2, wherein a thermostat is in the flow resistance, which thermostat bypasses the cooling circuit in a warming-up phase of the internal combustion engine.

4. A cooling system according to claim 3, wherein a water pump, which cycles the cooling water, is disposed between the thermostat and the internal combustion engine.

5. A vehicle operating system comprising:
   an internal combustion engine,
   an engine cooling circuit including at least one radiator and a coolant circuit with a coolant supply line leading to the engine and a coolant return line leading from the engine, and
   a transmission heat exchanger for cooling oil of an automatic transmission,
      wherein a branching pipeline is connected to the coolant supply line and flows through the transmission heat exchanger,
      wherein a flow resistance is connected in the coolant supply line upstream of the internal combustion engine and downstream of the connection with the branching pipeline, and
      wherein a shut-off valve, which is controlled as a function of the temperature, is connected in the branching pipeline downstream behind the transmission heat exchanger.

6. A vehicle operating system according to claim 5, wherein the shut-off valve is switched at least as a function of oil sump temperature of the transmission.

7. A vehicle operating system according to claim 6, wherein a thermostat is in the flow resistance, which thermostat bypasses the cooling circuit in a warming-up phase of the internal combustion engine.

8. A vehicle operating system according to claim 7, wherein a water pump, which cycles the cooling water, is disposed between the thermostat and the internal combustion engine.

* * * * *